United States Patent [19]
Balaban et al.

[11] Patent Number: 5,940,572
[45] Date of Patent: Aug. 17, 1999

[54] INTEGRATED TELEVISION AND VIDEO CASSETTE RECORDER SYSTEM

[75] Inventors: Alvin Reuben Balaban, Clinton Township; Michael Low, South Brunswick, both of N.J.

[73] Assignees: Daewoo Electronics Co. Ltd., Seoul, Rep. of Korea; Sarnoff Corporation, Princeton, N.J.

[21] Appl. No.: 08/757,975

[22] Filed: Nov. 27, 1996

[51] Int. Cl.$^6$ ....................................... H04N 5/91
[52] U.S. Cl. ............................... 386/46; 386/25; 348/665
[58] Field of Search .................................. 386/9, 25–26, 386/38, 46, 114, 116; 358/906, 909.1; 348/552, 606–607, 665, 908; H04N 5/91

[56] References Cited

U.S. PATENT DOCUMENTS

| | | | |
|---|---|---|---|
| 3,969,755 | 7/1976 | Arimura et al. | |
| 4,737,862 | 4/1988 | Koga | 358/329 |
| 4,819,101 | 4/1989 | Lemelson | 358/906 |
| 4,947,263 | 8/1990 | Yun | 358/335 |
| 4,991,026 | 2/1991 | Takase et al. | 358/328 |
| 5,023,931 | 6/1991 | Streck et al. | 455/21 |
| 5,083,197 | 1/1992 | Ko et al. | 358/19 |
| 5,142,375 | 8/1992 | Fukuda et al. | 358/906 |
| 5,159,462 | 10/1992 | Yasumura et al. | 358/906 |
| 5,173,779 | 12/1992 | Lee | 358/909.1 |
| 5,299,002 | 3/1994 | Funayama | 348/607 |
| 5,323,242 | 6/1994 | Yamamoto et al. | 358/324 |
| 5,448,305 | 9/1995 | Hagino | 348/665 |
| 5,650,827 | 7/1997 | Tsumori et al. | 348/565 |

FOREIGN PATENT DOCUMENTS

| | | |
|---|---|---|
| 0 687 107 A2 | 12/1995 | European Pat. Off. |
| 0 687 107 A3 | 7/1996 | European Pat. Off. |
| 3126731 C2 | 3/1982 | Germany |

OTHER PUBLICATIONS

Onga et al., Signal–Proc. LSI's 8mm Camcorder, IEEE, pp. 494–501, Aug. 1990.

*Primary Examiner*—Wendy Garber
*Assistant Examiner*—Vincent F. Boccio
*Attorney, Agent, or Firm*—William J. Burke

[57] ABSTRACT

A system for processing both a composite video television (TV) signal and a video cassette recorder (VCR) playback signal containing a combined line noise canceller and comb filter sharing a single delay line and a 3.58 MHz oscillator that drives a quadrature demodulator for demodulating both playback chrominance signals extracted from the playback signal and television chrominance signals extracted from the television signal. The system also provides automatic gain control to both the composite video TV signal and the VCR playback signal.

14 Claims, 7 Drawing Sheets

INTEGRATED TELEVISION AND VIDEO CASSETTE RECORDER SYSTEM

The invention relates to television receivers and video cassette recorders. More particularly, the invention relates to a combined television receiver and video cassette recorder system.

BACKGROUND OF THE DISCLOSURE

A combination of a television (TV) receiver and a video cassette recorder (VCR) within a single enclosure provides a consumer with a useful combination of functions in a single piece of consumer electronics equipment. Using a combined TV/VCR system, a viewer can watch a television program from either a pre-recorded video cassette tape or from a broadcast or cable TV station. In addition, a viewer may record a received broadcast or cable television program on a video cassette tape.

Current TV/VCR systems simply combined, within a single enclosure, the circuitry found in a conventional VCR with the circuitry found in a conventional television. The circuitry of the two component systems are not integrated with one another. As such, these systems contain an overabundance of redundant circuitry which leads to high manufacturing costs and a substantial number of manufacturing steps.

Therefore, there is a need in the art for a TV/VCR system that minimizes the redundant circuitry of present TV/VCR systems.

SUMMARY OF THE INVENTION

The disadvantages heretofore associated with the prior art are overcome by the present invention of a combined TV/VCR system having minimal circuitry redundancy. The system of the present invention accomplishes three functions: (1) signals received from a TV or video input port are processed into conventional video display signals (e.g., red, green, blue (RGB) signals); (2) the TV video input signal is processed into luminance ($Y_{rec}$) and chrominance ($C_{rec}$) signals for recording by the VCR heads; and (3) composite playback signals from the VCR heads are processed into the conventional video display signals (e.g., RGB signals). As such, the system either operates in a TV mode wherein the TV signals are prepared for both display and recording, or a playback mode where the system is configured for processing the playback signals from the video heads for display.

Although the TV and VCR luminance signals are substantially similar in format, the chrominance signals are quite different. As such, the system uses common circuitry for luminance processing while the chrominance signals are processed using both dedicated circuitry and common circuitry. Specifically, the television chrominance signals are quadrature modulated onto a 3.58 MHz carrier while the VCR chrominance signals are quadrature modulated onto a 629 kHz modulated carrier. Although the inventions use a single 3.58 MHz crystal controlled clock and a single quadrature demodulator to demodulate both the VCR and TV signals, some filter functions require switching the signal paths to filter circuits dedicated to either VCR or TV signals.

Specifically, the invention is a system for processing both a composite video television (TV) signal and a video cassette recorder (VCR) playback signal containing: a luminance/chrominance signal separator for generating a playback luminance signal and a playback chrominance signal from the VCR playback signal; a playback luminance signal demodulator for demodulating the playback luminance signal to produce a baseband playback luminance signal; a combined line noise canceller (LNC) and comb filter processor having a single delay line for extracting a TV luminance signal and a TV chrominance signal from the composite video TV signal; a chrominance processor for generating color difference signals from either the TV chrominance signal or the playback chrominance signal; a luminance processor for generating a common luminance signal from either the TV luminance signal or the baseband playback luminance signal; and color processor for converting the common luminance signal and the color difference signals into display signals.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention is a combined television and video cassette recorder (TV/VCR) system which minimizes the components within such a system. Component minimization is accomplished by using the same circuit for both VCR functions and television functions via multiplexed utilization of the common circuitry. Multiplexing of circuitry is accomplished using solid state switches, or other signal routing devices. These switches are indicated throughout the drawings by the blocks marked "SW."

The system of the present invention must accomplish three functions: (1) signals received from a TV or video input port must be processed into conventional video display signals (e.g., red, green, blue (RGB) signals); (2) the TV video input signal must be processed into luminance ($Y_{rec}$) and chrominance ($C_{rec}$) signals for recording by the VCR heads; and (3) composite playback signals from the VCR heads must be processed into the conventional video display signals (e.g., RGB signals). As such, the system either operates in a TV mode wherein the TV signals are prepared for both display and recording, or a playback mode where the system is configured for processing the playback signals from the video heads for display.

Although the TV and VCR luminance signals are substantially similar in format, the chrominance signals are quite different. As such, the system uses common circuitry for luminance processing while the chrominance signals are processed using both dedicated circuitry and common circuitry. Specifically, the television chrominance signals are quadrature modulated onto a 3.58 MHz carrier while the VCR chrominance signals are quadrature modulated onto a 629 kHz modulated carrier. Although the inventions use a single 3.58 MHz crystal controlled clock and a single quadrature demodulator to demodulate both the VCR and TV signals, some filter functions require switching the signal paths to filter circuits dedicated to either VCR or TV signals.

Figure 1:
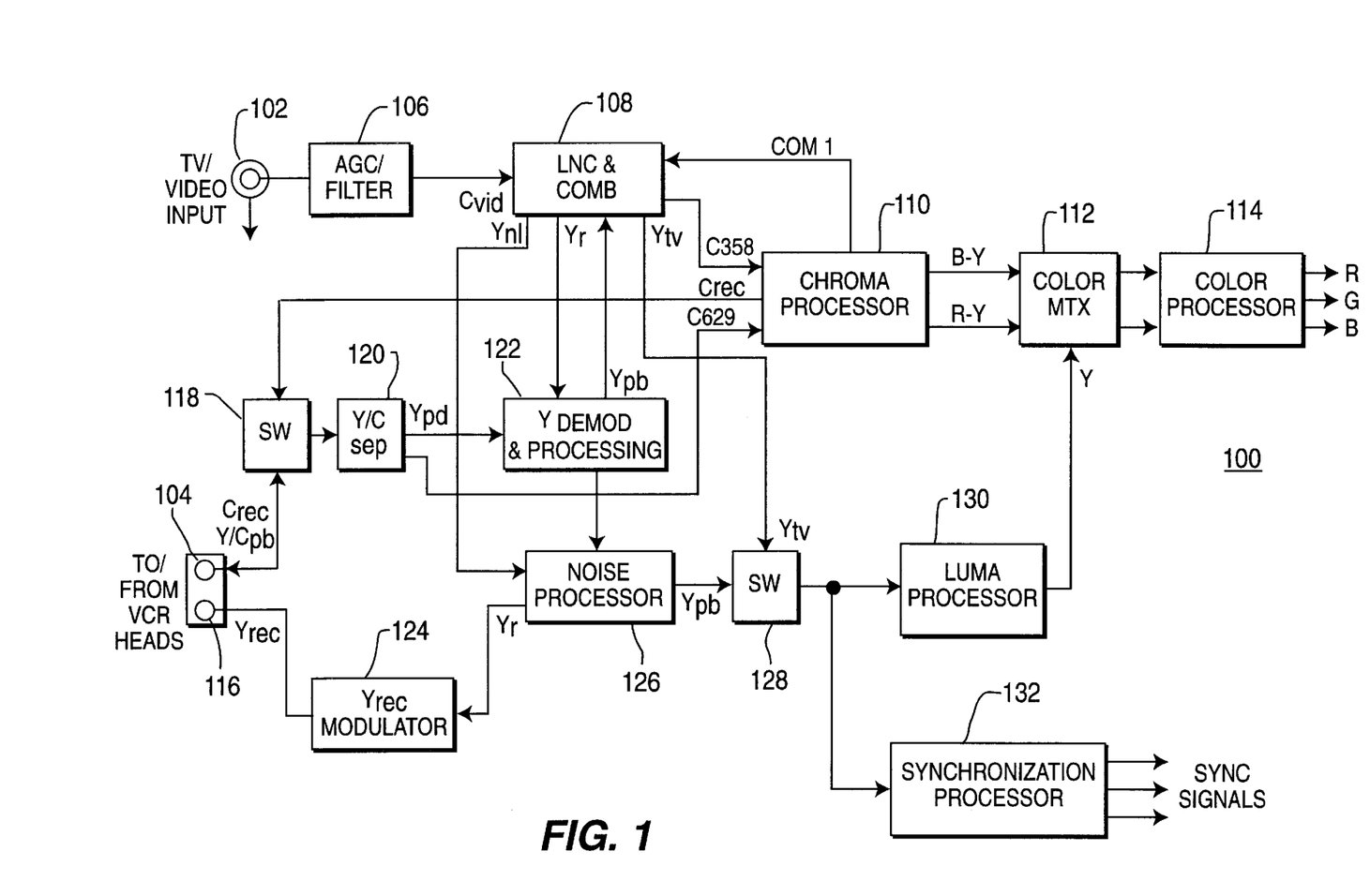
FIG. 1 depicts a high-level block diagram of a TV/VCR system in accordance with the present invention.

FIG. 1 depicts a high-level block diagram of the TV/VCR system of the present invention. The system 100 has an input port 102 for TV or composite video signals, as well as an input port 104 for playback signals from the VCR heads. The TV/video input port 102 is connected to an automatic gain control and filtering circuit 106 which produces composite video signal having a relatively stable amplitude. The composite video signal (CVID) forms an input to the LNC and comb filter circuitry 108. This single circuit 108 produces the luminance signal ($Y_{tv}$) and the chrominance signal (C358) from the composite video signal. Additionally, the circuitry 108 produces a luminance signal $Y_r$ for recording by the VCR heads.

The luminance signal $Y_{tv}$ is processed by the luma processor 130 and applied to the color matrix 112 as in a conventional television system. The chrominance signal C358 is processed by the chroma processor 110 to generate the conventional color difference signals (B-Y and R-Y) which are applied to the color matrix 112. The color matrix converts the color difference signals in response to the luminance signal into signals that can be processed by the color processor 114 which converts the output of the color matrix 112 into conventional red, green, blue (RGB) signals. In the TV mode, the switch 128 is positioned to pass the television luminance signal to the luminance processor 130 as well as to the synchronization processor 132 to generate conventional synchronization signals for the video display.

In this mode, the record luminance signal ($Y_r$) is processed by the luminance demodulator and processing circuitry 122, noise processed within the noise processor 126, then modulated into the proper VCR format by the luminance recording signal modulator 124, and finally applied to the VCR heads through port 116. Thus, in the television mode, the system produces conventional synchronization and color signals for display, as well as a record signal in an appropriate luminance recording format for the VCR heads. The chroma processor also converts the C358 chrominance signal into a chrominance recording signal ($C_{REC}$) that, when the system is in the television mode, passes through switch 118 to the chrominance recording head of the VCR heads through port 104.

When operating in the playback mode, the composite video signal $Y/C_{pb}$ is generated by the VCR heads at port 104, passed through switch 118 to a luminance chrominance separator 120 to produce the playback luminance signal ($Y_{pb}$) and the playback chrominance signal C629. The chrominance signal C629 is further coupled to and processed by the chroma processor 110 to generate the color difference signals. The playback luminance $Y_{pb}$ signal is demodulated in the luminance demodulator and processing circuitry 122 to produce a baseband luminance playback signal which is processed by the noise processor 126 and passed through switch 128 to the luma processor 130. The luma processor 130 generates the conventional luminance signal which is used by the color matrix 112 to convert the color difference signals and ultimately produce RGB signals for display. In this mode, the playback signals from the VCR heads are converted, by synchronization processor 132, into conventional synchronization signals.

Figures 2, 2A:
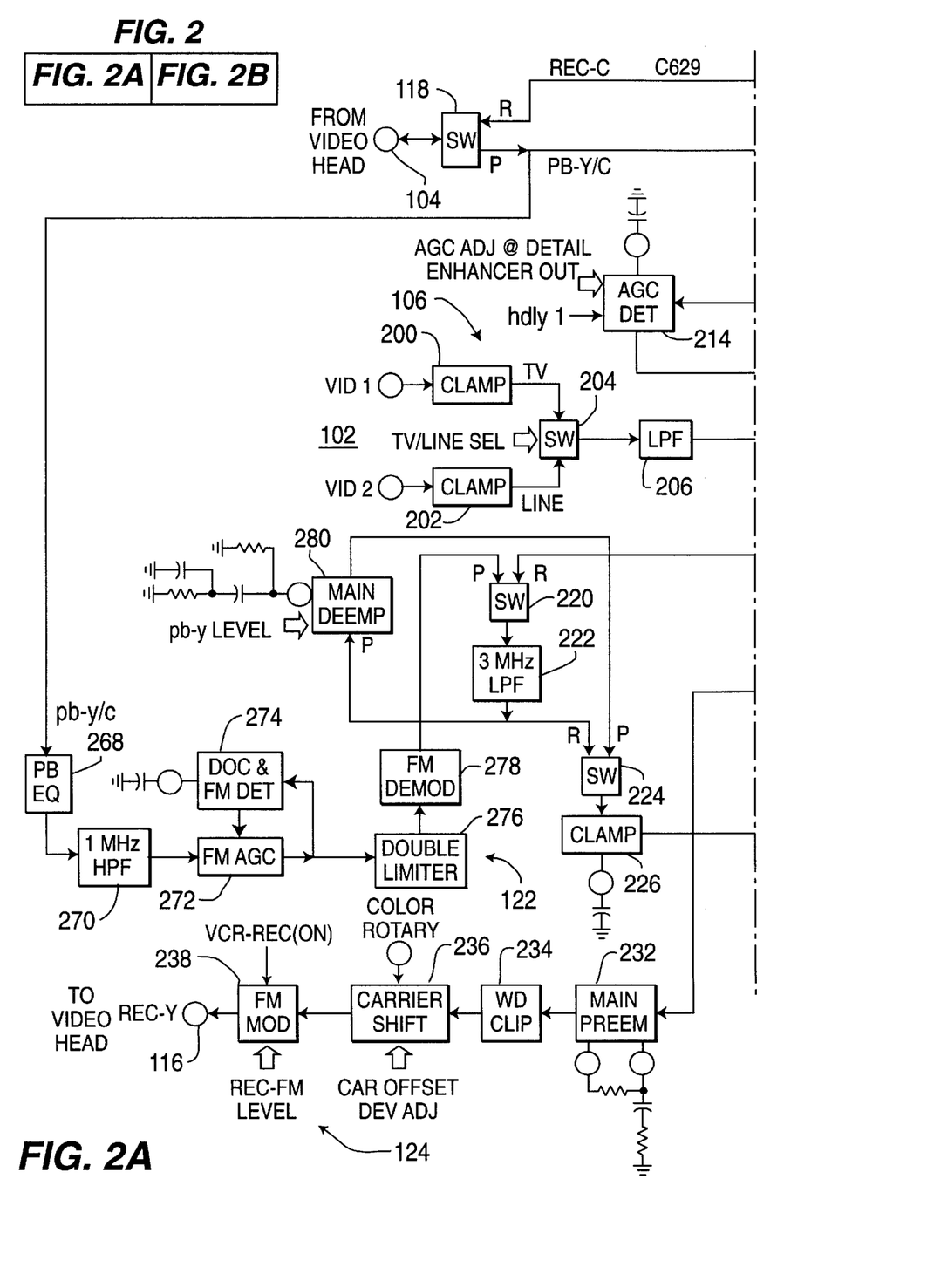
FIG. 2 depicts a block diagram of a luminance/chrominance (Y/C) separator, a luminance modulator and a luminance demodulator of the present invention.
Figure 2B:
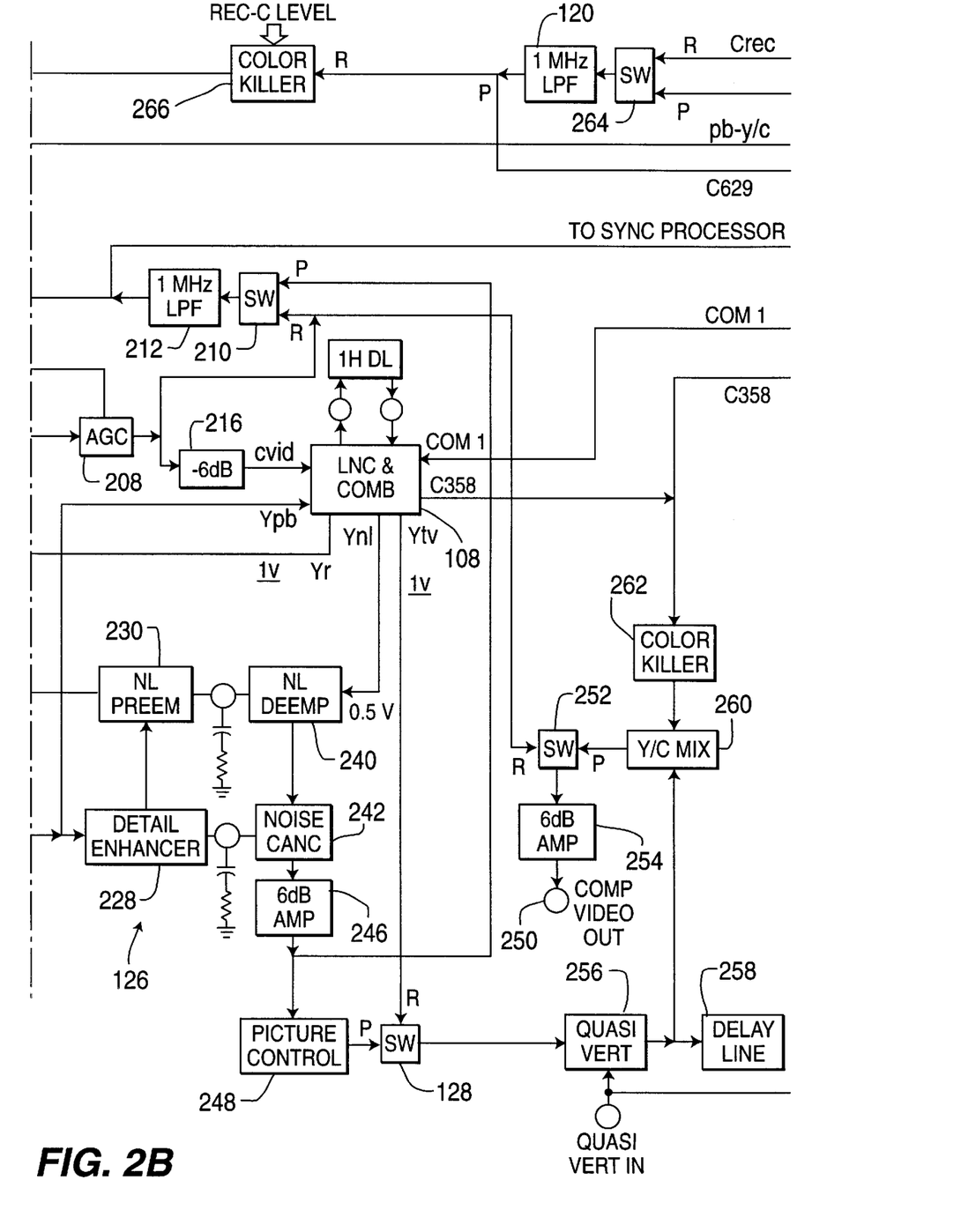

FIG. 2 depicts the input signal processing circuitry of the present invention including the luminance/chrominance (Y/C) separator 120 and 270, a luminance modulator 124 and demodulator 122, and the input processing circuitry for the television signals (AGC/filter 106). The TV/video input port 102, comprises two ports, one for broadcast television signals, and one for a conventional "line-in" composite video signal from, for example, a video source such as a video disk player and the like. The source of video signal is user controlled via the TV/line switch 204. To limit the signal strength input to the system, clamp circuits 200 and 202 are located between the input ports 102 and the switch 204. The selected input signal is filtered by low pass filter 206 and then coupled to an automatic gain control circuit 208. The automatic gain control circuit 208 insures that the signal to the LNC and comb filter circuit 108 substantially maintains a constant amplitude for amplitude variations in input video signal. In the TV mode used for receiving television signals, the output of the AGC is passed through a switch 210 which is positioned to couple the output of the AGC to a 1 MHz low pass filter 212. The output of the low pass filter is, in turn, coupled to an AGC detector 214 that converts the filtered signal into a DC bias voltage that controls the automatic gain control circuitry 208. The AGC detector uses, as a basis for the AGC control voltage amplitude, the largest of either a white signal level or a delayed and amplified sync pulse sample (the hdly1 signal from the synchronization processor 132 described below with respect to FIG. 6).

Additionally, the output of the AGC is coupled through a 6 dB attenuator 216 to the composite video input port (CVID) of the LNC and comb filter circuitry 108. The LNC and comb filter circuitry 108 produces, from the composite video, a chrominance signal C358, a non-linear luminance signal ($Y_{n1}$) and a luminance signal $Y_{TV}$. The chrominance signal appears on port C358, and the luminance appears on port $Y_{TV}$. The LNC and comb filter circuitry 108 also produces a record luminance signal ($Y_r$) and a non-linear, luminance signal $Y_{n1}$.

As discussed above, the system produces a recording signal (e.g., a luminance recording signal $Y_{rec}$ and a chrominance recording signal $C_{rec}$) for the VCR from the received television signal. This signal is produced, in part, as the luminance record signal $Y_{rec}$. When in the television mode, the switch 220 connects the R terminal to the 3 MHz low pass filter 222. The output of the 3 MHz low pass filter is coupled to a second switch 224 which passes the signal on the R port through to clamp 226. The output of the clamp is processed by the noise processing circuitry 126. Specifically, the signal is detail enhanced by circuit 228 and a pre-emphasized by circuit 230 to improve picture quality for the recorded signal. Thereafter, the signal is further processed by the following serially connected circuitry: a main pre-emphasis circuit 232, a clipping circuit 234, a carrier shift circuit 236 and FM modulator circuit 238 which generates a luminance signal $Y_{rec}$ for recording using the video heads. The modulator 238 is only operational when the record function is activated on the VCR, e.g., the modulator is operational when the VCR.REC (ON) signal is high. Such signal processing to produce a luminance signal for a VCR is well known in the art.

When in the television mode, the luminance TV ($Y_{TV}$) signal is passed through switch 128 from the R terminal to the quasi-vertical processing circuit 256. In the TV mode, this circuit 256 has no effect. In the VCR mode, the quasi-vertical processing circuit inserts a quasi-vertical synchronization signal to facilitate fast preview and review functions. The output of circuit 256 is passed through a delay line 258 to the luminance signal process (130 in FIG. 1) as well as the synchronization signal processor (132 in FIG. 1). The delay line compensates for the time required to process the chrominance signal.

In the playback mode, all of the switches within the system connect the P terminal to their respective output terminals. As such, information from the video head is coupled to the P port of switch 118. The playback signal, on port 104, is a composite video signal Y/C$_{pb}$ carrying both luminance and chrominance signals. The P terminal is connected to switch 264 which, in turn, couples the composite signal to a 1 MHz low pass filter 120 which removes the luminance signal from the composite signal, resulting in an output of chrominance signal C629 at a nominal 629 kHz carrier. In other words, the filter 120 operates, in part, as a Y/C separator.

The composite signal Y/C$_{pb}$ from the playback heads is also coupled to circuitry for processing the luminance information. The composite playback signal is processed by a playback signal equalizer 268 which insures that the composite signal that is coupled to the 1 MHz high pass filter 270 maintains a substantially flat frequency response. The output of the 1 MHz high pass filter 270 contains only the luminance information. The luminance information carrying signal is then processed by an FM/AGC circuit 272 and an FM detector 274 which provides the DC bias signal to the AGC 272. The output of the AGC 272 is coupled to a series connected double limiter 276 and an FM demodulator 278 to produce the baseband luminance signal Y$_{pb}$. The baseband luminance signal Y$_{pb}$ is coupled through switch 220 to a 3 MHz low pass filter 222. The output of the 3 MHz low pass filter 222 is coupled to a main de-emphasis signal processor 280. The de-emphasized signal is coupled to switch 224, and the output of the switch is coupled to a clamp 226 to limit the signal strength that is sent to the input of the LNC and comb filter circuitry 108. The luminance signal Y$_{pb}$ from the playback video is processed by the LNC and comb filter circuitry 108 to produce a non-linear luminance signal Y$_{n1}$ that is then further processed by the serially connected non-linear (NL) deemphasis circuit 240, a noise cancellation circuit 242, 6 dB amplifier 246 and a picture control circuit 248. Ultimately, the signal is passed through switch 128 for processing by the luminance processor 130 as well as the synchronization processor 132. The output of amplifier 246 is coupled through switch 210 to 1 MHz low pass filter 212 to produce a second input signal for the synchronization processor 132.

In the playback mode, circuitry is used to provide outputs such as a composite video output signal (port 250) which, in essence, combines the chrominance signals with the luminance signal to produce a composite video output using the Y/C mixer 260 and a 6 dB amplifier 254. In addition, the chrominance processor 110 provides a chrominance record signal C$_{rec}$ that is passed through switch 264 from the R port to the 1 MHz low pass filter 120 and on to a color killer circuit 266. During the television mode, this combination of circuits generates a chrominance signal that is quadrature-phase modulated onto a 629 kHz carrier that is appropriate for recording by the video heads.

Figure 3:
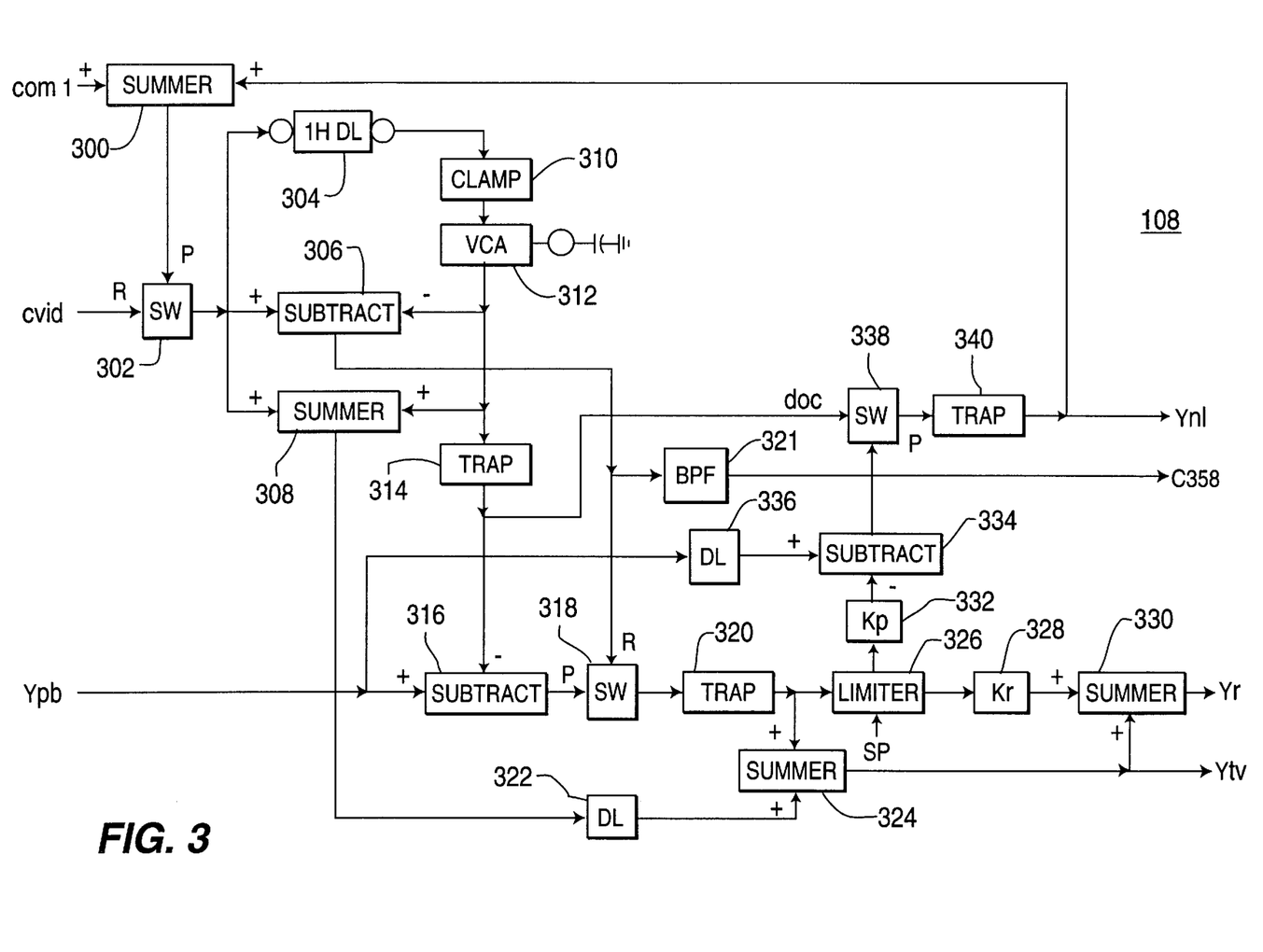
FIG. 3 depicts a block diagram of a combined LNC and comb filter circuit of the present invention.

FIG. 3 is a detailed block diagram of the LNC and comb filter circuit 108. In this circuit, as in the previous description, the switches connect the R port to the output of the switch when in the television mode and the P port to the output of the switch when in the VCR playback mode. In the television mode, the composite video (CVID) is passed through switch 302 to an input terminal of a subtractor 306 and a summer 308, as well as a delay line 304 having a length of one horizontal line (1 H). The output of the 1 H delay line 304 is coupled to a clamp 310, as well as voltage controlled amplifier (VCA) 312. The output of the VCA 312 is coupled to the minus terminal of subtractor 306. As such, the delayed signal is subtracted from the input signal which effectively spreads the noise content of one line over two lines (e.g., suppressing the noise by 3 dB). The difference signal is bandpass filtered by bandpass filter 321 to produce the chrominance signal C358 carried upon a 3.58 MHz carrier.

The input to the bandpass filter 321 also passes through switch 318 as well as trap 320. The output of the trap 320 passes through a limiter 326, a scaler 328, and a summer 330 to produce the record luminance signal Y$_r$. Additionally, the output of the trap 320 forms one input into a summer 324. The other input to the summer is a modified input signal. The composite video is also summed, in summer 308, with the delayed composite video to form a sum signal. The sum signal is delayed using delay line 322 and applied to one input of the summer 324. The output of the summer 324 is the luminance TV signal Y$_{TV}$. This luminance TV signal is also summed with the output of scaler 328 to form the record luminance signal Y$_R$. As such, in the TV mode, circuitry 108 operates as a comb filter and extracts the luminance and chrominance signal from the composite video signal.

In the playback mode, each of the switches connects the P port to the output port. The com1 signal is a 3.58 MHz chrominance signal that is produced from an the chrominance processor 110. The com1 signal is coupled to an input terminal of summer 300. The other input terminal is coupled to the non-linear luminance signal Y$_{n1}$. The output of the summer 300 is a composite video signal representing the video from the VCR having the TV format, e.g., a chrominance signal at 3.58 MHz. This signal is coupled through switch 302 to summer 308, delay line 304 and subtractor 306. The signal is also delayed, clamped, amplified, trapped and coupled to the negative terminal of subtractor 316. The output of subtractor 316 is coupled through trap 320, limiter 326 and scaler 332 to the negative terminal of subtractor 334. The playback luminance signal Y$_{pb}$ is delayed in delay line 336 and coupled to the positive terminal of subtractor 334. The difference signal is coupled through switch 338 and trap 340 to form the non-linear luminance signal Y$_{n1}$. The processing of the combined non-linear luminance signal (Y$_{n1}$) and the chrominance signal (COM1) reduces line noise from the luminance signal Y$_{n1}$. As such, circuit 108 operates as a line noise canceller and comb filter when the system is in the VCR playback mode and operates as a comb filter when the system is in the TV mode. Furthermore, by subtracting a delayed line from a present line, the circuit 108 removes (cancels) adjacent line chrominance information that is picked up by the VCR heads. Specifically, as a VCR head scans a line, the head also responds to signals in the adjacent lines. The circuit 108 reduces this adjacent line interference.

Additionally, the circuit 108 contains a drop out compensator that repairs any drop outs in the playback video. This function is accomplished by switch 338 inserting the drop out compensation signal (doc) into any portion of the luminance signal having a drop out. A drop out is detected by the FM demodulator (274 in FIG. 2). The doc signal is the 1 H delayed luminance signal (e.g., trap 314 passes only luminance information). As such, a portion of a previous line can be selectively inserted into a drop out portion of a present line. Such drop out compensation techniques are well known in the VCR art.

Figure 4:
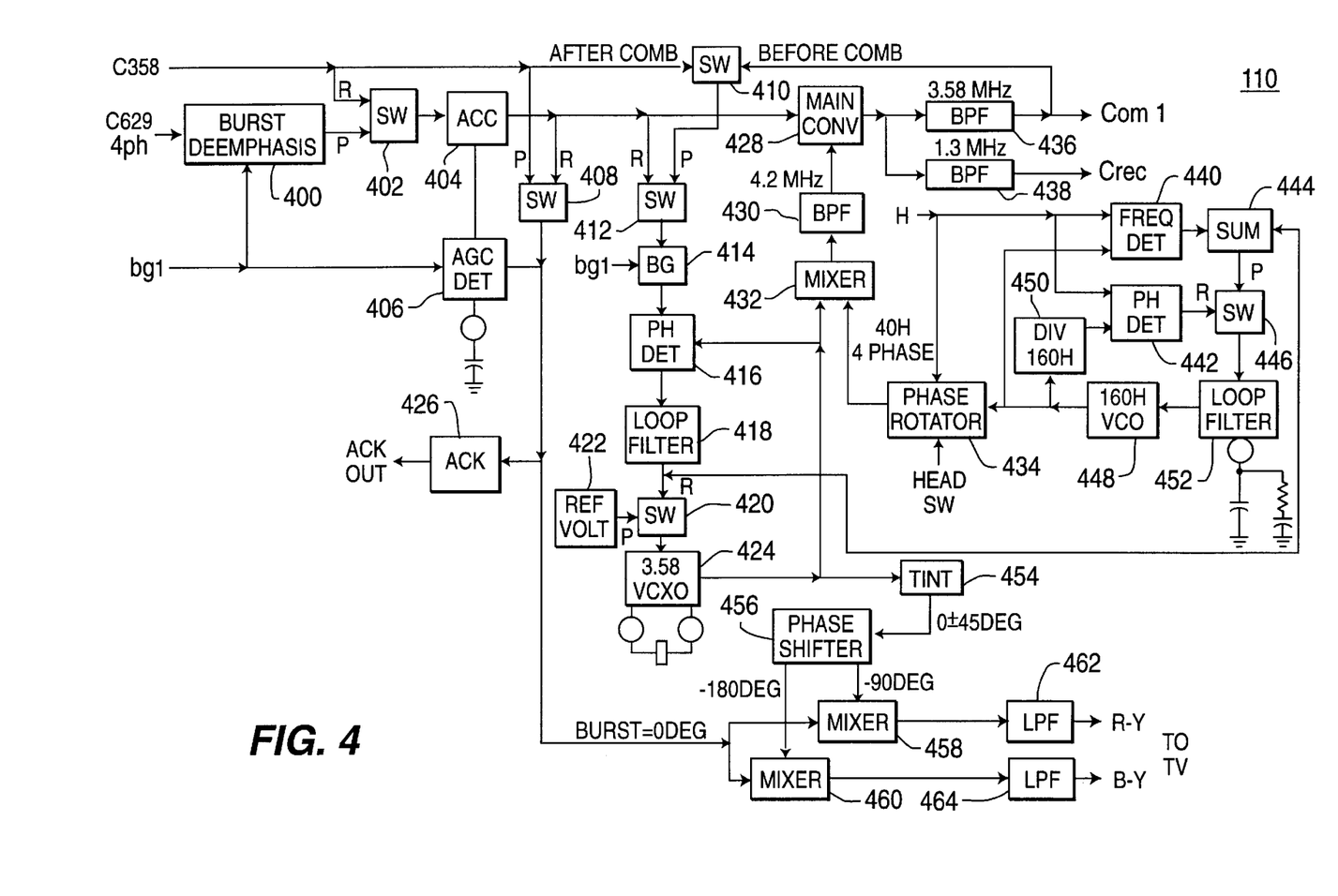
FIG. 4 depicts a block diagram of a chrominance signal processor of the present invention.

FIG. 4 depicts the chrominance signal processor 110. Again, in a television mode, the R port of each switch is coupled to its output, and in the playback mode, the P port of the switch is coupled to its output. The chrominance signal C358 in the television mode is coupled to the automatic color control (ACC) circuit 404 (e.g., an AGC circuit for the chrominance signal) through switch 402 and onto the main converter 428 where it is mixed with a 4.2 MHz signal to produce a 629 KHz chrominance signal. This signal is used to generate the record chrominance signal $C_{rec}$. The chrominance signal has a center frequency of 629 kHz and is passed through the low pass filter 438 to form the chrominance record signal $C_{rec}$. In this mode, the bandpass filter for the 3.58 MHz chrominance signal rejects the output of the main converter 428.

The output of the ACC 404 is coupled through switch 408 to the quadrature demodulator containing a phase shifter 456 and mixers 458 and 460 that are driven by the 3.58 MHz clock signal in quadrature. The output of the mixers is coupled to a pair of low pass filters 462 and 464 to produce the color difference signals R-Y and B-Y.

The voltage controlled crystal oscillator (VCXO) 424 oscillates at 3.58 MHz and is phase-locked to the output of the ACC 404 through switch 412, a burst gate circuit 414, a phase detector 416, and loop filter 418 that couples a control signal to the 3.58 MHz VCXO. The output of the VCXO 424 is coupled through a conventional tint controller 454 to the quadrature demodulator.

To produce the 4.2 MHz used by the main converter 428, the output of the 3.58 MHz oscillator is coupled to mixer 432 which is mixed with a signal that is 40 times the horizontal synchronization signal frequency (e.g., 629 kHz) to produce a 4.2 MHz signal. The 4.2 MHz signal is bandpass filtered in filter 430 and coupled to the main converter 428. To produce the 40 times horizontal frequency signal, the horizontal synchronization signal H is coupled to a frequency detector 440 and a phase detector 442, as well as a phase rotator 434. The frequency detector 440 is not used in the TV mode. The output of the phase detector 442 is coupled through switch 446 to a loop filter 452, which in turn controls 160 times the horizontal synchronization signal voltage controlled oscillator (160 H VCO) 448. The output of the 160 H VCO 448 is divided by 160 times the horizontal frequency, in divider 450, to be applied as a reference signal to one input of the phase detector 442. The output of the 160 H VCO 448 is coupled to the phase rotator 434 which is synchronized with head rotation of the VCR through the head SW signal. The output from the phase rotator 434 is a four-phase signal at 40 times the frequency of the horizontal synchronization signal.

In the playback mode, the 629 kHz chrominance signal is first de-emphasized in the burst de-emphasis circuit 400 and coupled through switch 402 to the ACC 404. The output of the ACC is coupled to the main converter 428 which, when multiplied by the 4.2 MHz signal, generates a 3.58 MHz signal derived from the chrominance signal that is coupled to bandpass filter 436. The common output (com1) from the bandpass filter is coupled through the switches 410 and 412 to the burst gate circuit 414, phase detector 416 and loop filter 418 as well as the 160 H VCO, such that the VCO is now locked to the chrominance signal produced by the VCR. Frequency detector 440 is used to prevent side lock of the 160 H VCO. The reference voltage for the 3.58 MHz is fixed during playback mode by source 422 coupled through switch 420 such that the VCXO free runs at a nominal 3.58 MHz. In playback mode, the com1 signal is processed by the LNC and comb filter to cancel line noise and produce the C358 signal. This filtering also cancels the adjacent line chrominance signals produced during playback. The C358 chrominance signal is an up-converted version of the VCR chrominance signal (C629). Thus, a C358 signal during playback mode is derived from the chrominance signal generated by the video heads. This C358 signal is coupled through switch 408 to the quadrature demodulator such that the chrominance information and the video playback signal generates the color difference signals R-Y and B-Y. All the other timing circuitry functions as discussed above.

Figure 5:
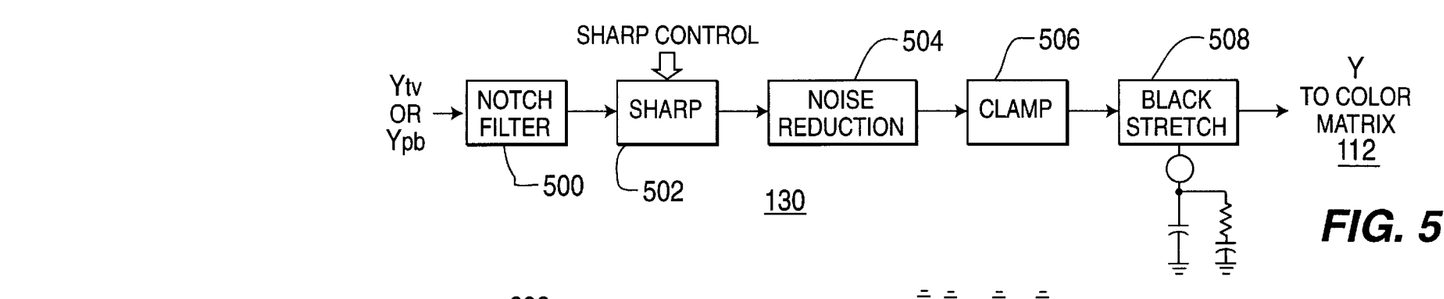
FIG. 5 depicts a block diagram of a luminance signal processor of the present invention.

FIG. 5 depicts a block diagram of the luminance signal processor 130. The luminance signal, whether generated by the television input or the VCR playback signal, is conventionally processed using a serial connected notch filter 500, a sharpness control circuit 502, noise reduction circuitry 504, a clamp 506 and a black stretching circuit 508, all connected in series. These circuits work in a conventional manner to produce a luminance signal Y that is coupled to the color matrix circuitry 112.

Figure 6:
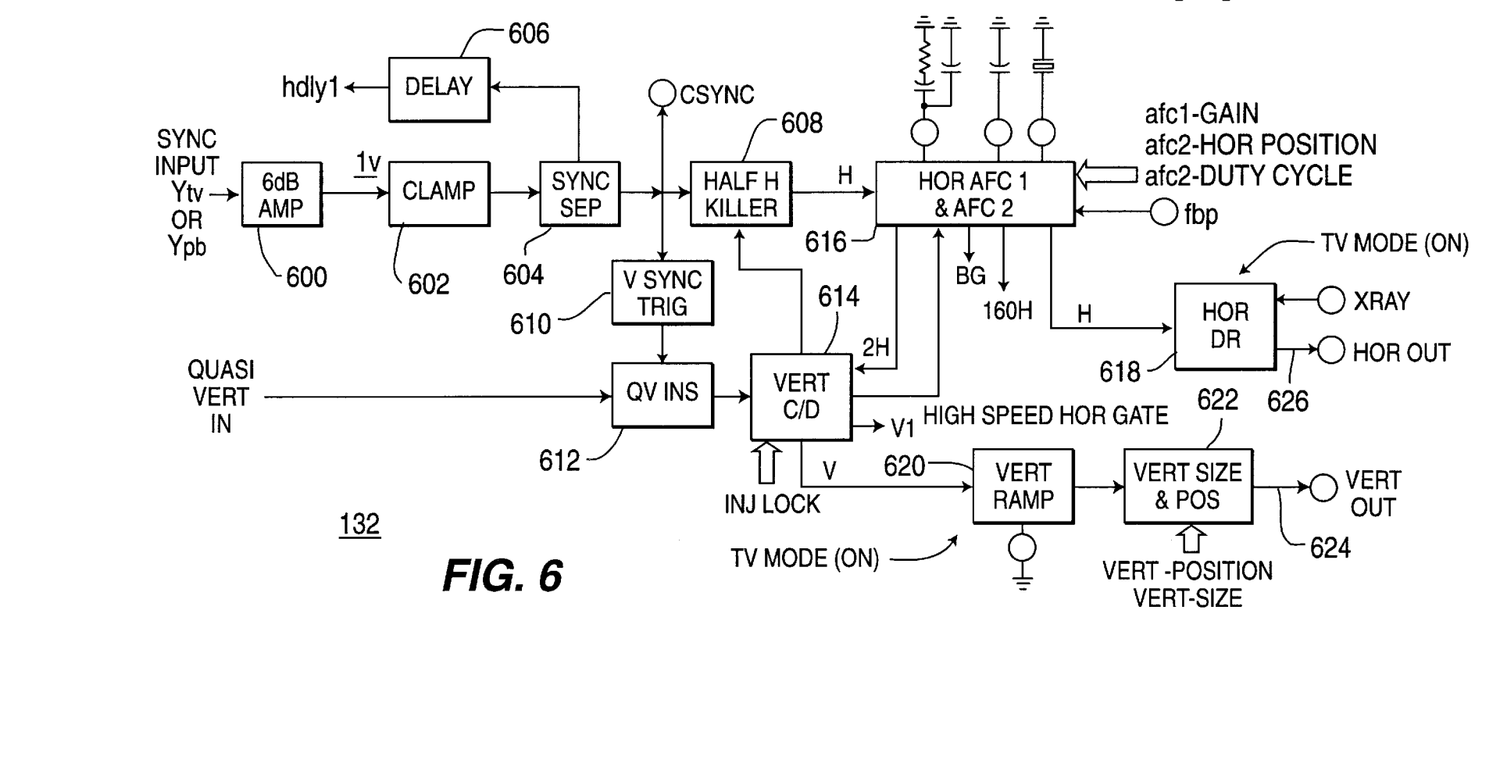
FIG. 6 depicts a block diagram of a synchronization signal processor.

FIG. 6 depicts circuitry 132 used for conventional generation of vertical and horizontal synchronization signals from the sync signal input. The luminance signal (either $Y_{pb}$ or $Y_{TV}$) is applied to a 6 dB amplifier 600, a clamp 602 and a sync separator circuit 604, connected in series. The sync separator 604 produces a composite sync pulse. The horizontal sync pulse portion of the composite sync pulse is delayed using delay 606 to place the horizontal sync pulse within the back porch of the sync signal. The delayed signal is labeled "hdly1". This signal is used by the AGC circuit to establish the amplification level in AGC (208 in FIG. 2). The synchronization information is separated from the luminance information and passed to the half H killer 608 and the vertical synchronization trigger 610. The output from the vertical synchronization trigger 610 is applied to the quasi vertical sync signal insertion circuit (QVINS) 612. The quasi vertical signal is conventionally generated and inserted to facilitate use of fast forward preview functions of the VCR. The QVINS output is connected to the vertical count down (C/D) 614, which in turn, generates a vertical signal that is passed through the vertical ramp 620 and the vertical size and position circuits 622 to produce a vertical synchronization signal output (port 624). The horizontal signal is processed by the horizontal AFC circuitry 616 to produce the 160 times the horizontal frequency. The horizontal signal is also passed through the horizontal drive circuitry 618 to produce the horizontal signal output (port 626).

Figure 7:
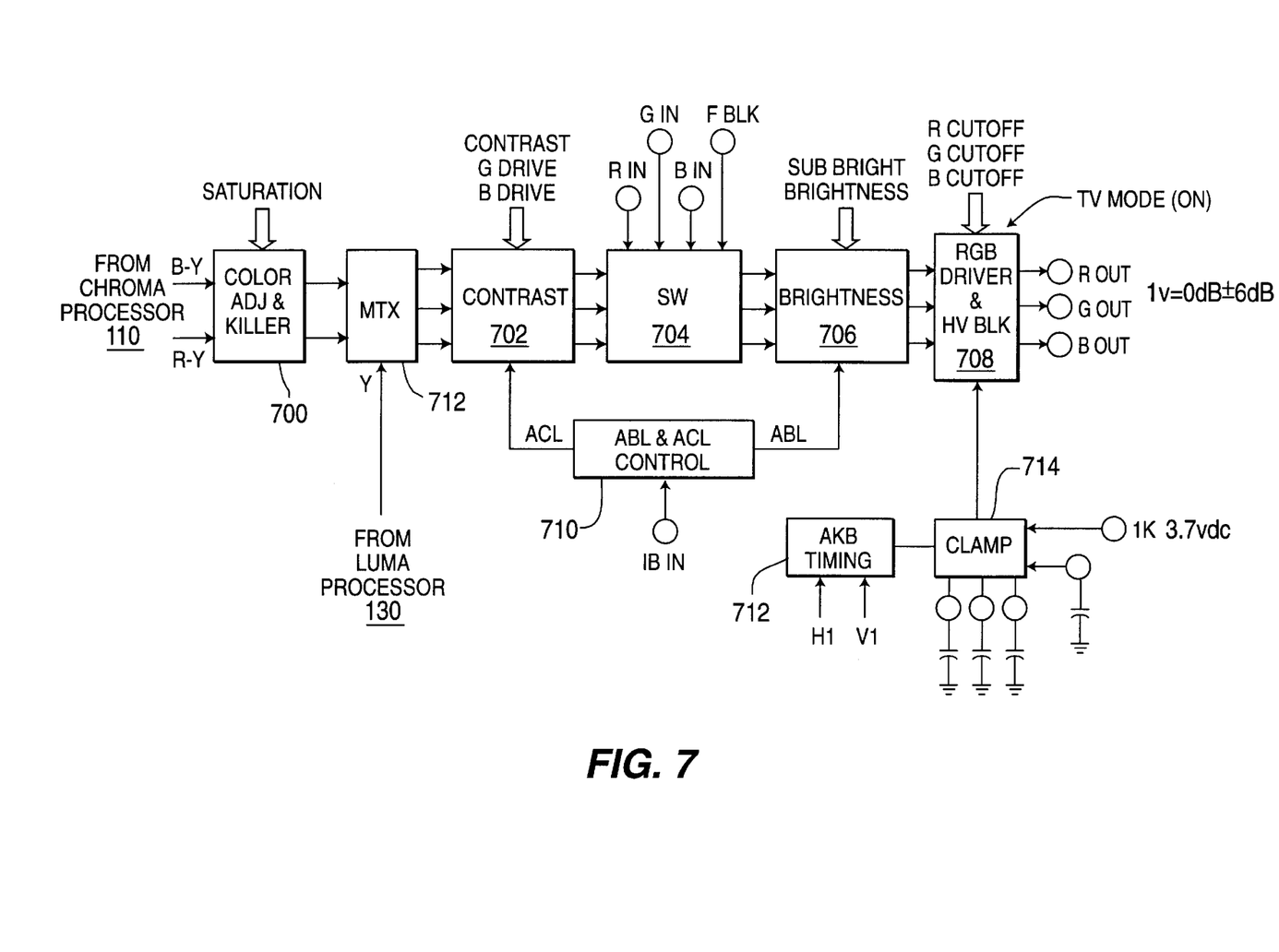
FIG. 7 depicts a block diagram of an output color matrix and color processor of the present invention.

FIG. 7 depicts a block diagram of the output processing for the color difference signals produced by the chrominance processor 110. The output processor processes the color difference signals into standard color signals, e.g., red, green, blue (RGB), and the like. Specifically, the color difference signals are first applied to the color adjusting and killer circuitry 700. The output of the killer adjuster 700 is applied to the conventional color matrix 112 which converts the color difference signals into RGB signals using the luminance signal Y generated by the luminance processor 130. The contrast is adjusted in the contrast circuitry 702 and brightness is controlled in the brightness circuitry 706. Switch 704 facilitates insertion of on-screen display (OSD) graphics onto the display. Lastly, the RGB driver and horizontal and vertical blanking circuit 708 generates the RGB signals that control the electron guns within the display. Brightness and contrast are controlled by control circuitry 710 and is also user controlled.

All of the foregoing circuitry is implemented as a single ASIC; however, other implementations such as discrete components, software, a plurality of integrated circuits and the like are not beyond the scope of this invention.

Although various embodiments which incorporate the teachings of the present invention have been shown and described in detail herein, those skilled in the art can readily devise many other varied embodiments that still incorporate these teachings.

What is claimed is:

1. An integrated television and video cassette recorder system for processing both a composite video television (TV) signal having a chrominance signal modulated onto a first carrier frequency and a video cassette recorder (VCR) playback signal having a chrominance signal modulated onto a second carrier frequency, said first carrier frequency being higher than said second carrier frequency, said system comprising:
   a line noise canceller and a comb filter that share a signal delay line;
   a chrominance separator for extracting said first chrominance signal from said composite video television (TV) signal and said second chrominance signal from said video cassette recorder (VCR) playback signal;
   a frequency converter, coupled to said chrominance separator, for converting said first carrier frequency of said first chrominance signal into said second carrier frequency for said first chrominance signal; and
   said comb filter is coupled to said frequency converter and filters either said second chrominance signal or said first chrominance signal having said second carrier frequency.

2. The system of claim 1 further comprising means for producing automatic gain control for said composite video television signal and said video cassette recorder playback signal.

3. An integrated television and video cassette recorder system for processing both a composite video television (TV) signal having a first chrominance signal modulated onto a first carrier frequency and a video cassette recorder (VCR) playback signal having a second chrominance signal modulated onto a second carrier frequency, said first carrier frequency being higher than said second carrier frequency, said system comprising:
   a chrominance separator for extracting said first chrominance signal from said composite video television (TV) signal and said second chrominance signal from said video cassette recorder (VCR) playback signal;
   a frequency converter, coupled to said chrominance separator, for converting said first carrier frequency of said first chrominance signal into said second carrier frequency for said first chrominance signal;
   a comb filter, coupled to said frequency converter, for filtering either said second chrominance signal or said first chrominance signal having said second carrier frequency.

4. The system of claim 3 wherein said comb filter further comprises a line noise canceller, where said comb filter and said line noise filter share a single delay line.

5. The system of claim 4 wherein said delay line has a delay equal to the duration of a horizontal line duration.

6. The system of claim 3 further comprising:
   an oscillator; and
   a phase locked loop, coupled to said oscillator, for phase locking said oscillator to said second chrominance signal or said first chrominance signal having said second carrier frequency.

7. The system of claim 6 further comprising:
   a quadrature demodulator, coupled to said oscillator, for demodulating either said second chrominance signal or said first chrominance signal having said second carrier frequency.

8. The system of claim 3 further comprising:
   a frequency generator, coupled to said frequency converter, for generating a conversion frequency that converts a second chrominance signal carrier frequency to said first carrier frequency.

9. The system of claim 3 further comprising:
   a luminance separator for generating a first luminance signal from said composite video television (TV) signal and a second luminance signal from said video cassette recorder (VCR) playback signal; and
   a synchronization separator for extracting synchronization signals from either said first luminance signal or said second luminance.

10. An integrated television and video cassette recorder system for processing both a composite video television (TV) signal having a first chrominance signal modulated onto a first carrier frequency and a video cassette recorder (VCR) playback signal having a second chrominance signal modulated onto a second carrier frequency, said first carrier frequency being higher than said second carrier frequency, said system comprising:
    a chrominance separator for extracting said first chrominance signal from said composite video television (TV) signal and said second chrominance signal from said video cassette recorder (VCR) playback signal;
    a frequency converter, coupled to said chrominance separator, for converting said first carrier frequency of said first chrominance signal into said second carrier frequency for said first chrominance signal;
    an oscillator, coupled to said frequency converter, for providing a frequency;
    a phase locked loop, coupled to said oscillator, for phase locking said frequency of said oscillator to said second chrominance signal or said first chrominance signal having said second carrier frequency; and
    a quadrature demodulator, coupled to said oscillator, for demodulating either said second chrominance signal or said first chrominance signal having said second carrier frequency.

11. The system of claim 10 further comprising:
    a comb filter, coupled to said frequency converter, for filtering either said second chrominance signal or said first chrominance signal having said second carrier frequency.

12. The system of claim 10 wherein said comb filter further comprises a line noise canceller, where said comb filter and said line noise filter share a single delay line.

13. The system of claim 12 wherein said delay line has a delay equal to the duration of a horizontal line duration.

14. An integrated television and video cassette recorder system for processing both a composite video television (TV) signal having a first chrominance signal modulated onto a first carrier frequency and a video cassette recorder (VCR) playback signal having a second chrominance signal modulated onto a second carrier frequency, said first carrier frequency being higher than said second carrier frequency, said system comprising:
    a chrominance separator for extracting said first chrominance signal from said composite video television (TV) signal and said second chrominance signal from said video cassette recorder (VCR) playback signal;
    a frequency converter, coupled to said chrominance separator, for converting said first carrier frequency of said first chrominance signal into said second carrier frequency for said first chrominance signal;

a combined comb filter and line noise canceller, coupled to said frequency converter, for processing either said second chrominance signal or said first chrominance signal having said second carrier frequency, where said combined comb filter and line noise filter share a single delay line, and said delay line has a delay equal to the duration of a horizontal line duration;

an oscillator, coupled to said frequency converter, for producing a first conversion frequency;

a phase locked loop, coupled to said oscillator, for phase locking said oscillator to said second chrominance signal or said first chrominance signal having said second carrier frequency;

a quadrature demodulator, coupled to said oscillator, for demodulating either said second chrominance signal or said first chrominance signal having said second carrier frequency;

a frequency generator, coupled to said frequency converter, for generating a second conversion frequency that converts said second chrominance signal carrier frequency to said first carrier frequency, where said second conversion frequency is phase locked to a horizontal line frequency;

a luminance separator for generating a first luminance signal from said composite video television (TV) signal and a second luminance signal from said video cassette recorder (VCR) playback signal; and a synchronization separator for extracting synchronization signals from either said first luminance signal or said second luminance.

* * * * *